United States Patent [19]

Rivoir

[11] 4,452,540
[45] Jun. 5, 1984

[54] BEARING ASSEMBLY FOR THE MOVABLE MEMBER OF A MEASURING INSTRUMENT

[76] Inventor: Karl H. Rivoir, Am Nagoldhang 5, 7530 Pforzheim, Fed. Rep. of Germany

[21] Appl. No.: 373,255

[22] Filed: Apr. 29, 1982

[30] Foreign Application Priority Data

May 5, 1981 [DE] Fed. Rep. of Germany ....... 3117634

[51] Int. Cl.³ .................. F16C 27/08; F16C 17/08
[52] U.S. Cl. ..................................... 384/99; 384/225; 384/234; 384/246
[58] Field of Search .............. 384/99, 125, 218, 219, 384/225, 231–234, 243–246, 193, 194, 415, 371

[56] References Cited

U.S. PATENT DOCUMENTS

| 3,012,828 | 12/1961 | Matthey | 384/225 |
| 3,037,824 | 6/1962 | Loretan | 384/125 |
| 3,797,219 | 3/1974 | Kieronski et al. | 384/233 X |
| 4,116,501 | 9/1978 | Mötz | 384/99 |

FOREIGN PATENT DOCUMENTS 2554178 6/1977 Fed. Rep. of Germany.
478440 10/1969 Switzerland.
790825 2/1958 United Kingdom ............... 384/234
1425691 2/1976 United Kingdom.

Primary Examiner—Stuart S. Levy
Assistant Examiner—Thomas R. Hannon
Attorney, Agent, or Firm—Toren, McGeady and Stanger

[57] ABSTRACT

A bearing assembly for mounting the movable member of a measuring instrument includes a bearing element engaging the movable member, a spring member applying a force to the bearing element in a direction toward the movable member, and a shock absorber fixed in the assembly operating as an abutment against which the bearing element is urged by the spring member. A liquid damping system provided in the assembly is formed by a first chamber located on the bearing side of the bearing element and a second chamber located on the opposite side of the bearing element with one or more passages being provided for the damping liquid to flow between the first and the second chamber during displacement of the bearing element, the passage being proportioned relative to the bearing element such that only a relatively small damping force is applied against the bearing element during displacement thereof.

30 Claims, 12 Drawing Figures

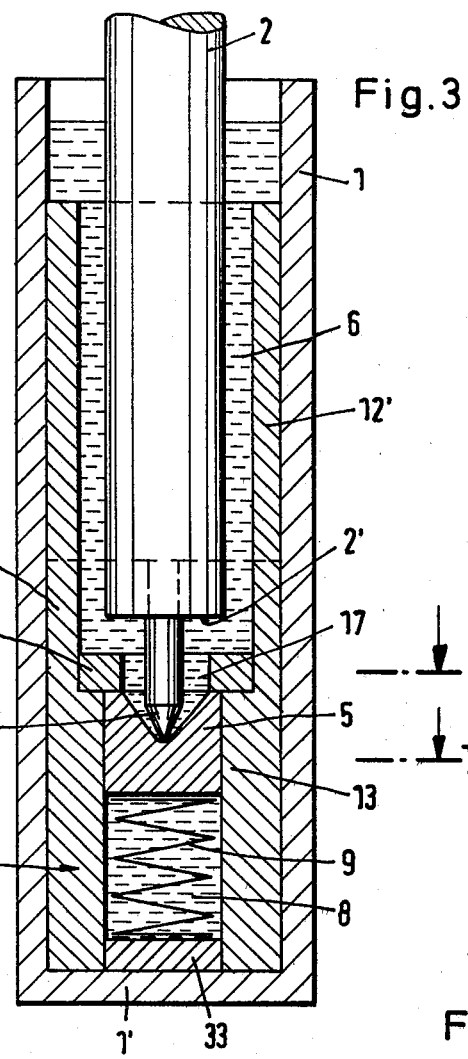
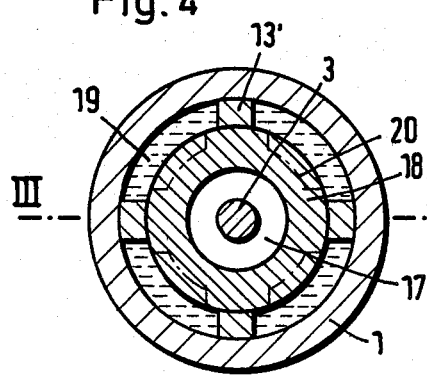
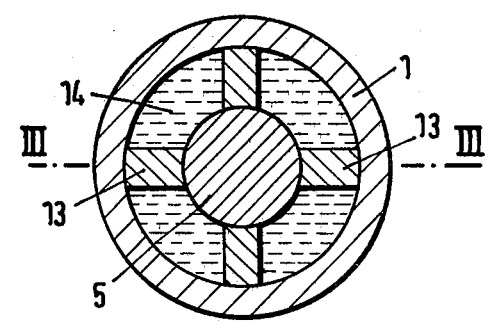
Fig. 3
Fig. 4
Fig. 5

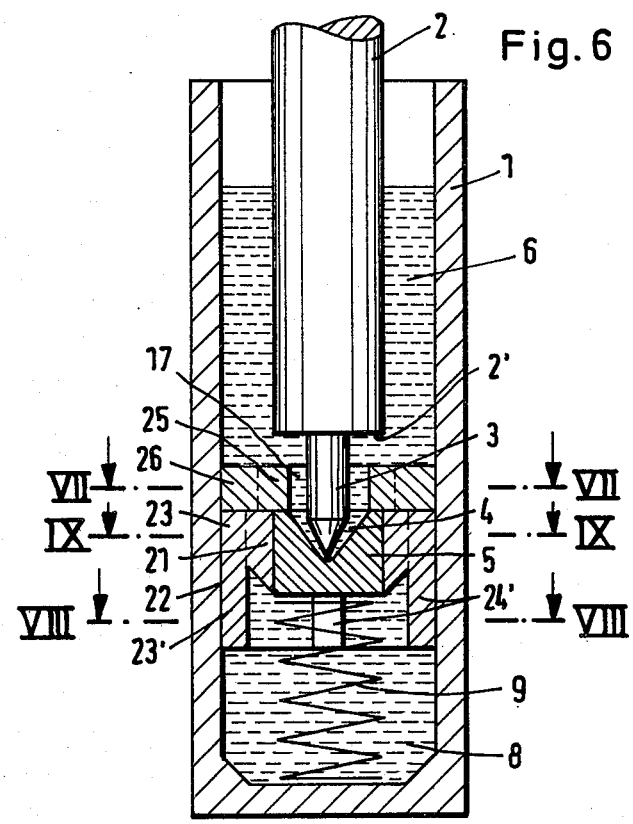
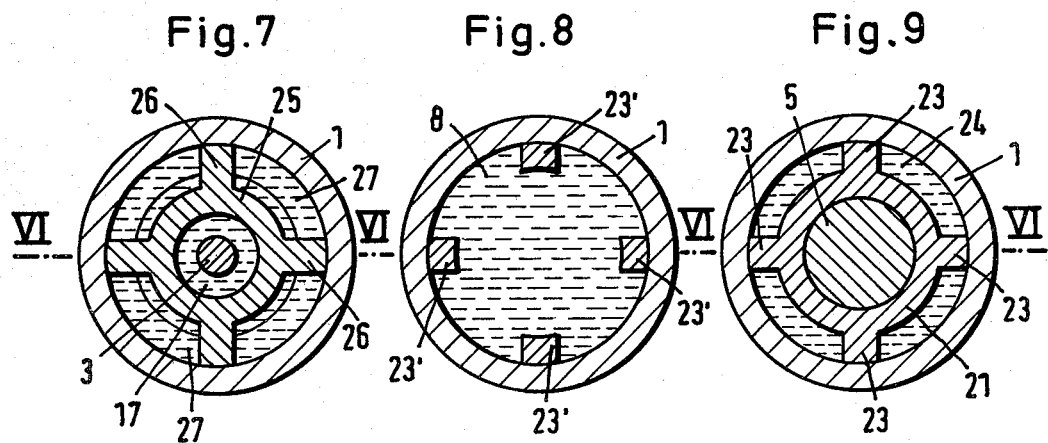

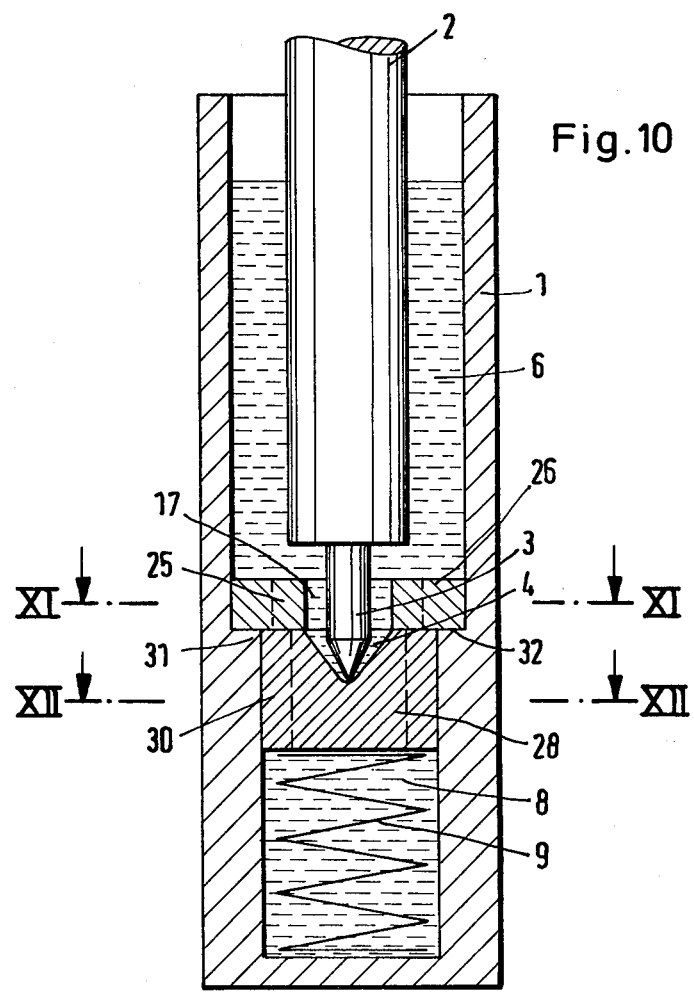
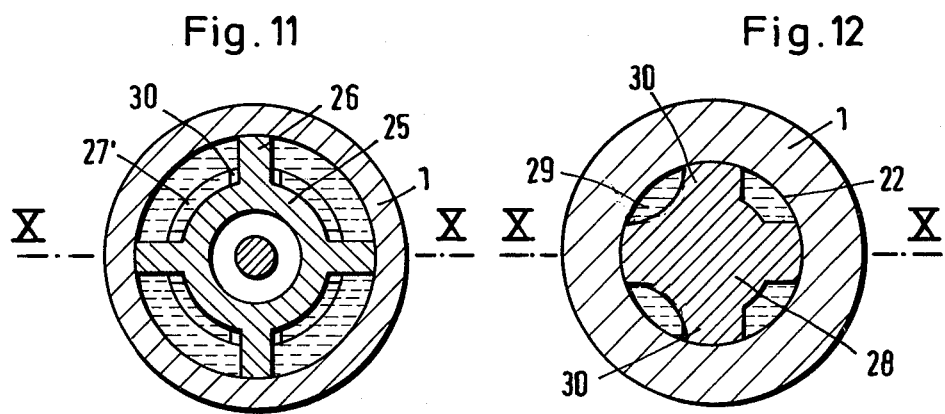

BEARING ASSEMBLY FOR THE MOVABLE MEMBER OF A MEASURING INSTRUMENT

The present invention relates generally to a bearing mechanism for supporting the movable member of a measuring instrument and more particularly to the type of assembly wherein the movable member of the measuring instrument is in engagement with a bearing element which is spring-loaded and which engages against a shock absorber in the assembly with fluid damping means being provided in the assembly.

In this connection, it is known from German Offenlegungsschrift No. 25 54 178 to mount the bearing element or jewel together with a container holding the damping liquid for movement against the pressure of the spring. In such an arrangement, it is disadvantageous for the container, the bearing element or jewel, and the damping liquid taken together to constitute a mass so great that with correspondingly high acceleration of the movable member of the measuring instrument there will result shocks, vibrations, or the like which might cause pivot tips of the mechanism to be damaged despite the maintenance of a low spring pressure. Such damage may occur as a result of the necessity for accelerating relatively high masses. In addition, in known bearing arrangements of this type, it is difficult to provide protection against leakage of the damping liquid without thereby further increasing the mass which must be accelerated.

Bearing mechanisms of the type referred to herein are also known which involve arrangements for damping the rotary movement of the parts mounted in the bearings, the bearings being spring-loaded. In such cases, usual spring bearings used in measuring instruments are simply filled with a damping liquid. However, it has been found that the liquid will tend to run out of the bearing mechanism and that part of the liquid will leak past the jewel or bearing element into the spring chamber.

Such leakage involves consequences in that, first, part of the damping liquid is no longer available to perform the appropriate damping function and, secondly, that the liquid contained in the spring chamber behind the bearing element will operate to hinder movement of the bearing element or jewel. Thus, desired protection against shock, particularly in cases where high acceleration may occur, will be rendered defective or inoperative.

The present invention is directed toward providing a bearing assembly of the type discussed which will provide several advantages in that, on the one hand, the bearing element may be spring mounted while the damping required for rotary movement of the movable parts of the measuring instrument may be ensured with the damping of of the rotary movement of a pointer shaft operating to prevent hunting of the pointer and thus shorten response time.

However, the invention is directed toward providing, on the other hand, an assembly wherein the mass which is required to be moved as a result of axial movements or accelerations and the resistance of the damping liquid which must be overcome do not hinder movement of the bearing element against the action of its supporting spring to such an extent that when axial movements or accelerations occur, the tip of a shaft or journal of the movable member mounted in the bearing element, or the bearing itself, will be damaged. At the same time, the invention is directed toward providing an assembly wherein the dimensions of the entire assembly are not larger, or are only insignificantly larger, than the dimensions customarily applicable to such bearing assemblies. Additionally, the invention seeks to provide a bearing and components which will be capable of manufacture by normal production methods at acceptable costs.

SUMMARY OF THE INVENTION

Briefly, the present invention may be described as a bearing assembly for mounting the movable member of a measuring instrument comprising housing means, a bearing element having a bearing side engaging said movable member, a first chamber on the bearing side of said bearing element containing damping liquid for damping rotary movement of the movable member, a spring member applying a spring force to the bearing element in a direction toward said movable member, a shock absorber fixed in said housing means operating as an abutment member against which said bearing element is urged by the spring member, a second chamber containing damping liquid located on the side of said bearing element opposite said bearing side, and damping liquid passage means formed between the first and second chambers for effecting passage of damping liquid therebetween upon displacement of the bearing element, the damping liquid passage means being structured to define a flow area which is dimensionally proportioned relative to the bearing element such that only a relatively small damping force is developed against the bearing element during displacement thereof as a result of flow of the damping liquid through the passage means between the first and the second chambers.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 3 is a longitudinal sectional view of a second embodiment of the invention taken along the line III—III shown in FIGS. 4 and 5;

FIG. 4 is a cross-sectional view taken along the line IV—IV in FIG. 3;

FIG. 5 is a cross-sectional view taken along the line V—V in FIG. 3;

FIG. 6 is a longitudinal sectional view of a third embodiment of the invention taken along the line VI—VI shown in FIGS. 7-9;

FIG. 7 is a cross-sectional view taken along the line VII—VII shown in FIG. 6;

FIG. 8 is a cross-sectional view taken along the line VIII—VIII shown in FIG. 6;

FIG. 9 is a cross-sectional view taken along the line IX—IX shown in FIG. 6;

FIG. 10 is a longitudinal sectional view of a fourth embodiment of the invention taken along the line X—X shown in FIGS. 11 and 12;

FIG. 11 is a cross-sectional view taken along the line XI—XI shown in FIG. 10; and FIG. 12 is a cross-sectional view taken along the line XII—XII shown in FIG. 10.

DETAILED DESCRIPTION OF THE PREFERRED EMBODIMENTS

Figure 1:
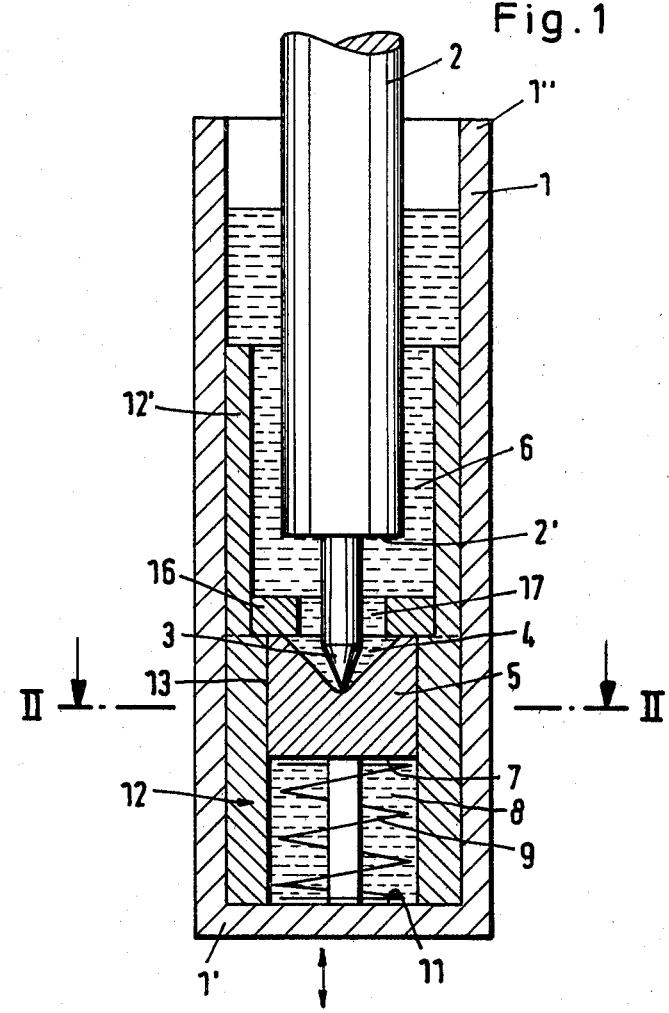
FIG. 1 is a longitudinal sectional view of a first embodiment of the invention taken along a line I—I shown in FIG. 2.

In the drawings, the several embodiments of the invention are depicted and similar reference numerals are used to identify similar parts throughout the various figures of the drawings. The first embodiment of the invention depicted in FIGS. 1 and 2 comprises a tubular housing 1 within which there is located a shaft or journal 2 of a movable member (not shown) of a measuring instrument (also not shown). The journal 2 is formed with a tip 3 having a generally conical configuration which extends into bearing engagement with a bearing jewel or element 5 at a conical opening 4 of the bearing element 5.

Adjoining the bearing element 5 on the bearing side thereof and located adjacent the conical opening 4 is a first liquid chamber 6.

A second liquid chamber 8 is formed on the opposite side of the bearing element 5.

Both the chambers 6 and 8 are filled with a damping liquid.

The bearing element 5 is movable in the axial or longitudinal direction as indicated by the double arrow 10 against the action of a spring 9 which is contained within the second chamber 8, the spring 9 being supported against a lower side 7 of the bearing element 5 and against a bottom surface 11 of the housing 1. Thus, the spring 9 operates to apply a spring force against the bearing element 5 toward or in the direction of the movable member or journal 2.

The bearing element 5 is supported in guided engagement within a mounting arrangement 12 which is provided with inwardly directed guide webs 13 which preferably extend in the longitudinal direction of the assembly and between which there are located passage apertures 14 which also preferably extend in the longitudinal direction of the assembly. Damping liquid passage means are provided between the first chamber 6 and the second chamber 8 in the form of a plurality of passages or apertures 14. As will be apparent from FIG. 2, the passages 14 are located between pairs of adjacent guide webs 13 and in accordance with preferred embodiments of the present invention, a plurality of guide members such as the guide webs 13 are provided and also a plurality of passages or apertures 14, the number of apertures and guides being three or, in this embodiment, preferably four. As a result of such an arrangement, adequate and preferably symmetrical support and guidance of the bearing element 5 may thus be achieved.

Figure 2:
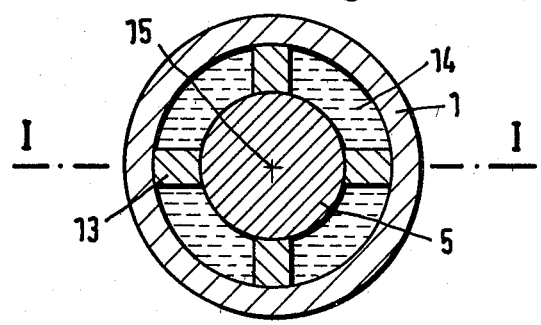
FIG. 2 is a cross-sectional view taken along the line II—II of FIG. 1.

In the arrangement depicted in FIGS. 1 and 2, the passages 14 are symmetrical and also concentric relative to the central longitudinal axis 15 of the bearing element 5 and thus of the entire bearing assembly. The arrangement of the guide webs 13 relative to the central longitudinal axis 15 is also concentric and preferably symmetrical.

The apertures 14 may be produced by a corresponding slotting of the mounting 12. The mounting 12 is formed with an upper portion 12' which is a continuous circular cylinder. In the embodiment of FIGS. 1 and 2, the upper portion 12' extends to the lower edge of a shock absorber 16 which is fixedly mounted in the assembly and against which the bearing element 5 abuts. The mounting 12 is formed below the cylinder 12' with the previously described guide webs 13 and as a result of this structure, adequate stability in the upper portion of the mounting is ensured.

The shock absorber 16 is fastened onto the upper cylinder 12' and the bearing element 5 will normally be pressed against the bottom of the shock absorber 16 under the pressure of the spring 9. However, if the measuring instrument should be subjected to a heavy axial load, a collar or shoulder 2' on the movable member 2 will be brought into engagement against the shock absorber 16 while at the same time the bearing element 5 is moved downwardly away from the shock absorber 16 against the force of the spring 9.

The shock absorber 16 is also provided with a passage or aperture which, in the embodiment of FIG. 1, consists of a bore 17 having a diameter which is greater than the diameter of the pivot tip 3 and which is normally blocked by the bearing element 5 but is opened when the bearing element 5 is moved downwardly.

When the element 5 is pressed downwardly against the action of the spring 9 upon the occurrence of an exceptional load upon the shaft or journal 2, the passages or apertures 14, 17 will permit damping liquid to flow from the second chamber 8 into the first chamber 6. For this reason, and also because of the slight or relatively low mass which must be moved, the movement of the bearing element 5 and its corresponding return movement which is effected by the action of the spring 9, will be restricted only to an insignificant degree and substantially the full effect of the spring 9 will be applied during the action of the bearing assembly. At the same time, however, the damping action of the damping liquid with regard to damping of the rotary movements of the movable member 2 will be maintained.

The housing 1, the mounting portion 12, and the shock absorber 16 are affixed together in any suitable manner. For example, the bearing housing 1 and the mounting portion 12 could be formed integrally with each other as a single component. In such a case, it would be preferable if the bottom portion 1' of the integral component formed by the housing 1 and the mounting 12 were to be made as a detachable closure. The bearing element 5 and the spring 9 may thus be fitted from the bottom of the integral component, the bottom being taken relative to the position of the assembly as shown in the drawing.

Of course, in the upper region 1" of the bearing housing 1, appropriate means may be provided to prevent escape of the damping liquid and such means may be formed in accordance with knowledge available in the art.

If the damping liquid is silicone oil, such a device may, for example, comprise a barrier of a material which would inhibit so-called "creeping" of silicone oil, such as polytetrafluorethylene. This would apply to the other embodiments of the invention, to be described hereinafter, inasmuch as many of the parts of the individual embodiments may be interchangeable with similar parts of other embodiments.

The embodiment of the invention shown in FIGS. 3–5 substantially corresponds with the embodiment shown in FIGS. 1 and 2, and it will be noted that the cross-sectional view of FIG. 5 is practically identical to the cross-sectional view of FIG. 2. In order to maintain the guide webs 13 at the correct distance apart from each other and thus to provide accurate sliding seating for the bearing element 5, a bottom part 33 is provided in the embodiment of FIGS. 3–5 which stabilizes the guide webs 13 and upon which the spring 9 is supported. The bottom part 33 is located at the bottom end of the guide webs 13, as seen in FIG. 3. Additionally, the continuous circular cylinder 12' is formed so that it no longer extends to the bottom edge of the shock absorber, but instead ends a distance above the shock absorber which, in FIG. 3, is identified with reference numeral 18. In addition to provision of a passage 17, there is also provided passages past the shock absorber which are in the form of apertures 19, with four such apertures 19 being provided in the present embodiment between the outer edge of the shock absorber 18 and the inner wall of the bearing housing 1. Centering of the shock absorber 18 is effected by extensions 13' of the guide webs 13 which are likewise made from the same material as that of the mounting portion 12. From FIGS. 3–5 it will be seen that the extensions 13' are narrower in the radial direction than the radial dimension of the guide webs 13, in accordance with the larger diameter of the shock absorber 18 as compared with the bearing element 5. Thus, in addition to the passages 17, other passages or apertures are provided for the damping liquid in the region of the shock absorber. Instead of or in addition to the passages 19, the shock absorber could also be provided at its edge with inwardly directed cutouts, which are shown in dash-dot lines in FIG. 4 and identified with reference numeral 20. The passages 19 or cutouts 20 lie above and are aligned with the passages 14.

It is also possible, although not specifically shown in the drawings, that when outer passages such as the passages 19 are provided in the shock absorber, a central passage such as the aperture 17 will no longer be required in the shock absorber.

In the embodiment depicted in FIGS. 6–9, the bearing housing 1, the movable member or journal 2, the pivot tip 3, the bearing opening 4, the bearing element or jewel 5, the spring 9, and the two chambers 6 and 8 containing the damping liquid are of a construction generally identical to that shown in connection with the two previously described embodiments. However, in the embodiment of FIGS. 6–9, the mounting portion 21 is attached or affixed to the bearing element 5 and the bearing element 5 and the mounting portion 1 slide together under an applied axial load relative to the bearing housing along the inner wall 22 which provides a guide surface. In order to reduce dead weight, the mounting 21 may be made of plastic.

The cross-sectional view of FIG. 9 depicts the guide webs 23 as extending outwardly from the hollow cylindrical mounting 21 and in sliding engagement against the inner wall 22 of the bearing housing 1. In the embodiment shown, four guide webs 23 are provided and they form therebetween passages 24 which are additionally bounded by the outer wall of the mounting 21 and the inner wall of the bearing housing 1.

FIG. 8 shows that the guide webs may be extended downwardly as indicated by reference numeral 23' in order thereby to provide greater stability and a larger guide surface relative to the bearing housing for the entire mounting portion. It will be seen that in this embodiment, the passages 24 between the guide webs 23 provide sufficient free space for the passage of damping liquid from the second chamber 8 to the first chamber 6, and vice versa.

The cross-sectional view of FIG. 7 depicts another possible form of construction of the shock absorber which is identified by reference numeral 25 and which is provided with four outwardly directed holding webs 26 which together therewith form a star-like configuration and between which four passages 27 are provided. The holding webs 26 are arranged in alignment with the guide webs 23 and accordingly the passages 27 are located in alignment with the passages 24.

Thus, in this example it is also possible for additional passages or apertures to be advantageously provided in the region of the shock absorber in addition to the passage or bore 17. The shock absorber 25 is formed as a hollow circular cylinder and, as will also be seen from the drawing, it is fastened to the bearing housing 1 by means of the holding webs 26. The function of the shock absorber in this embodiment, as in the other embodiments, is similar to that described above in connection with the embodiment depicted in FIGS. 1 and 2.

In the embodiment depicted in FIGS. 10–12 there is provided a bearing element 28 which, unlike the previous embodiments, is itself provided with passages 29. In accordance with the left-hand portion of FIG. 12, the bearing element 28 may have the cross-sectional shape of a Maltese cross and in accordance with the right-hand part of FIG. 12, it may be star-shaped in cross-section. The bearing element 28 is formed with guide webs 30 arranged as outwardly directed extensions lying with a sliding fit against an inner wall 22 of the bearing housing 1. At this point, it should be again noted that in principle one communication opening is sufficient, for example, one passage 29, provided that the passage cross-section and the viscosity of the damping liquid are such that appropriate conditions are fulfilled.

The cross-section shown in FIG. 11 depicts a shock absorber 25 which is of a construction similar to the shock absorber in the example illustrated in FIGS. 6–9 and which has been identified with similar reference numerals, particularly with regard to FIG. 7. In this embodiment, however, the passages 27' between webs 26 are slightly narrower than the passages 27 depicted in FIG. 7 since, in the present case, the diameter of the bearing housing under the shock absorber has been reduced in accordance with reference numeral 31 in order to support the shock absorber and thus to form a circular annular support 32 for the shock absorber 25. In this embodiment also the shock absorber 25, which operates as a stop ring, is fastened to the bearing housing and is, for example, press fitted into the housing. The movement of the bearing element and the flow of damping liquid will in principle be the same as that in previously described embodiments, particularly the embodiment depicted in FIGS. 1 and 2. This also applies to the other embodiments described herein by way of example.

It will be seen from the embodiments of the invention disclosed above that, as a result of the structure of the invention, the mass which is to be moved against the action of the spring is maintained as low as possible. In practice, the mass which must be moved may be restricted to the bearing element itself. The damping liquid, which may be any suitable liquid of appropriate viscosity, for example, a silicone oil, ensures that in both chambers there occurs an adequate of vibrations, shocks, and the like in the rotary movement of the part mounted in the bearing. The passages or apertures between the first and the second chambers, however, make it possible for the damping liquid to flow out of the chamber lying in the direction of movement into the other chamber whenever the bearing element is displaced. The cross-sectional flow areas of these communication spaces formed by the respective passages or openings between the two chambers should be sufficiently large to ensure that, upon displacement of the bearing element, the damping liquid will not create an excessive resistance to movement thereof and will in fact preferably offer only relatively slight resistance thereby creating only a partial and preferably very slight restriction of axial movement of the movable member mounted in the bearing. As a result, in accordance with the problem defined previously herein, damage to the pivot tip will be prevented and where necessary also damage to the bearing element will be avoided as a result of axial shock occurring between these two parts.

The spring action and the damping effect of the liquid will, however, be retained.

If, on the other hand, the bearing element were to be simply mounted in the bearing housing for movement therein in a sliding guided manner, and without providing the special passages or openings, and if on the lower side a damping liquid were also to be provided, upon axial movement of the bearing element, this liquid would be able to pass only through a relatively small flow area through a very narrow gap between the bearing element and the guide wall of the bearing housing so that in such a case the bearing element would operate or act as a powerful damping hydraulic piston between the two chambers.

In accordance with the present invention, this disadvantage is avoided in that passages, such as the passages 14 shown in FIG. 1, are provided between the first damping chamber 6 and the second damping chamber 8. The cross-sectional area of the passages or apertures on the one hand, and the viscosity of the particular damping liquid utilized, on the other hand, should be matched to each other in accordance with the operating characteristics discussed above. In principle, in accordance with the invention, it should be endeavored to make the cross-sections of the passages or apertures as large as is technically possible and permitted by design considerations in order to ensure that even with a damping liquid of relatively high viscosity, the restriction of the axial movement of the bearing element will not become excessive. If, instead of such a damping liquid, use is made of a damping liquid of low viscosity, this will correspond to the preferred embodiment of the invention in that it will operate to keep the restriction of axial movement of the bearing element as low as possible.

The passages or apertures may be formed by the bearing element itself or they may also be disposed in the slide guide, for example, in the mounting 12 in relation to or together with the bearing element slides extending in the axial direction of the part mounted in the bearing and operating against the action of the spring. As indicated in the foregoing, in a preferred embodiment of the invention, the passages or apertures are situated between the bearing element, or a mounting part carrying the bearing element, on the one hand, and a guide surface on the interior of the housing on the other hand, and the cross-sectional area is formed so as to differ from a circular, complete annular gap.

When a shock absorber affixed to the bearing housing is provided between the first and the second chambers, the shock absorber, such as the member 16, may likewise be provided with one or more apertures to form passages for the damping liquid.

Thus, as will be noted from the foregoing, the invention may be provided in various structures, each of which will provide the basic features and advantages discussed.

While specific embodiments of the invention have been shown and described in detail to illustrate the application of the inventive principles, it will be understood that the invention may be embodied otherwise without departing from such principles.

What is claimed is:

1. A bearing assembly for mounting the movable member of a measuring instrument comprising: housing means; a bearing element having a bearing side engaging said movable member; first chamber means on said bearing side of said bearing element containing damping liquid for damping rotary movement of said movable member; spring means applying a spring force to said bearing element in the direction toward said movable member; shock absorber means fixed in said housing means operating as abutment means against which said bearing element is urged by said spring means; second chamber means containing damping liquid located on a side of said bearing element opposite said bearing side; and damping liquid passage means provided between said first and second chamber means for effecting passage of damping liquid therebetween upon displacement of said bearing element; said damping liquid passage means defining a flow area through which said damping liquid flows which is dimensionally proportioned relative to said bearing element such that only a relatively small damping force is developed against said bearing element during displacement thereof as a result of flow of said damping liquid through said passage means between said first and second chamber means.

2. An assembly according to claim 1 wherein said damping liquid passage means are defined between said bearing element and said housing means and that the cross-section of the damping liquid passage means differs from a circular complete annular gap.

3. An assembly according to claim 1 wherein said housing means includes mounting means having said bearing element in sliding guided engagement therewith, said damping liquid passage means being defined between said bearing element and said mounting means and that the cross-section of the damping liquid passage means differs from a circular complete annular gap.

4. An assembly according to claim 1 wherein said damping liquid passage means are provided in the form of a plurality of circular arcs.

5. An assembly according to claim 1 wherein said spring means comprise a compression spring supported between a side of said bearing element opposite said bearing side and said housing means and located within said second chamber means.

6. An assembly according to claim 1 wherein said damping liquid passage means comprise apertures extending in the direction of displacement of said bearing element.

7. An assembly according to claim 1 wherein said damping liquid passage means comprise a plurality of apertures disposed concentrically and symmetrically about said bearing element.

8. An assembly according to claim 1 further comprising mounting means surrounding said bearing element and supporting said bearing element in sliding engagement with said housing means, said damping liquid passage means being defined in said mounting means.

9. An assembly according to claim 8 wherein said mounting means is provided with apertures extending in the direction of movement of said bearing element and formed in the shape of peripheral cutouts.

10. An assembly according to claim 9 wherein said mounting means is provided with guide webs and wherein said damping liquid passage means comprise a plurality of apertures situated between said guide webs, said guide webs extending in the direction of movement of said bearing element.

11. An assembly according to claim 10 wherein said guide webs are affixed to said housing means and wherein said bearing element is in slided guiding engagement with said guide webs.

12. An assembly according to claim 10 wherein said guide webs are mounted for movement together with said bearing element in sliding guided engagement with said housing means.

13. An assembly according to claim 9 wherein said cutouts are open both toward an inner wall of said housing means and toward an outer wall of said bearing element or of said mounting means.

14. An assembly according to claim 9 wherein said mounting means is affixed with said housing means or is formed by the housing means itself and wherein said housing means is formed with a closure at the bottom thereof.

15. An assembly according to claim 8 wherein said mounting means extend into said first chamber means.

16. An assembly according to claim 8 wherein said mounting means is affixed on said bearing element and is displaceable together with said bearing element relative to said housing means with a sliding guide being provided between said mounting means and said housing means.

17. An assembly according to claim 16 wherein said mounting means is made of a material having a low mass characteristic.

18. An assembly according to claim 17 wherein said mounting means is made of plastic.

19. An assembly according to claim 16, 17 or 18 wherein said mounting means includes guide webs which extend radially outwardly from said mounting means and which guide said mounting means with a sliding fit in said housing means.

20. An assembly according to claim 19 wherein said mounting means include a hollow cylindrical portion and wherein separate guide webs are fastened on said hollow cylindrical portion.

21. An assembly according to claim 1 wherein said damping liquid passage means comprise apertures which are formed to extend through said bearing element.

22. An assembly according to claim 21 wherein said bearing element is provided with radially outwardly projecting guide webs which extend longitudinally in the direction of movement of said bearing element and between which said passage apertures are disposed, said guide webs operating to provide said bearing element with a sliding fit in said housing means.

23. An assembly according to claim 22 wherein said bearing element is formed with a cross-sectional configuration which is in the form of a Maltese cross.

24. An assembly according to claim 22 wherein said bearing element is formed with a star-shaped cross-sectional configuration.

25. An assembly according to claim 1 wherein said damping liquid passage means comprise a central bore formed to extend through said shock absorber means and passage apertures formed to extend through said bearing element between said bearing element and said housing means, said central bore of said shock absorber means and said passage apertures of said bearing element being in flow communication with each other.

26. An assembly according to claim 25 wherein said shock absorber means further comprises holding webs extending between said shock absorber means and said mounting means and defining therebetween passage apertures which are formed as part specially as a prolongation of said damping liquid passage means.

27. An assembly according to claim 26 wherein said holding webs are formed as part of said shock absorber means and are directed radially outwardly therefrom roughly in the form of a star.

28. A bearing assembly for mounting the movable member of a measuring instrument comprising: housing means; a bearing element having a bearing side engaging said movable member; first chamber means on said bearing side of said bearing element containing damping liquid for damping rotary movement of said movable member; spring means applying a spring force to said bearing element in the direction toward said movable member; shock absorber means fixed in said housing means operating as abutment means against which said bearing element is urged by said spring means; second chamber means containing damping liquid located on a side of said bearing element opposite said bearing side; and damping liquid passage means provided between said first and second chamber means for effecting passage of damping liquid therebetween upon displacement of said bearing element; said damping liquid passage means defining a flow area through which said damping liquid flows which is dimensionally proportioned relative to said bearing element such that only a relatively small damping force is developed against said bearing element during displacement thereof as a result of flow of said damping liquid through said passage means between said first and second chamber means; said shock absorber means comprising a shock absorber attached to said housing means provided for said movable member and said bearing element, said shock absorber being situated between said bearing element and said first chamber means and being configured to form part of said damping liquid passage means through which said damping liquid flows.

29. An assembly according to claim 28 wherein said shock absorber is formed with a central bore through which said movable member passes with a bearing end thereof, the diameter of said central bore being greater than the diameter of said bearing end.

30. A bearing assembly for mounting the movable member of a measuring instrument comprising: housing means; a bearing element having a bearing side engaging said movable member; first chamber means on said bearing side of said bearing element containing damping liquid for damping rotary movement of said movable member; spring means applying a spring force to said bearing element in the direction toward said movable member; shock absorber means fixed in said housing means operating as abutment means against which said bearing element is urged by said spring means; second chamber means containing damping liquid located on a side of said bearing element opposite said bearing side; damping liquid passage means provided between said first and second chamber means for effecting passage of damping liquid therebetween upon displacement of said bearing element; said damping liquid passage means defining a flow area through which said damping liquid flows which is dimensionally proportioned relative to said bearing element such that only a relatively small damping force is developed against said bearing element during displacement thereof as a result of flow of said damping liquid through said passage means between said first and second chamber means; and mounting means extending into said first chamber means surrounding said bearing element and supporting said bearing element in sliding engagement with said housing means, said damping liquid passage means being defined in said mounting means with said portion of said mounting means extending into said first chamber means operating to support said shock absorber means.

* * * * *